United States Patent [19]

Hasegawa et al.

[11] Patent Number: 5,618,621
[45] Date of Patent: Apr. 8, 1997

[54] BIAXIALLY ORIENTED LAMINATED POLYESTER FILM FOR USE AS FILM TO BE BONDED ONTO METAL SHEET

[75] Inventors: Kinji Hasegawa, Hachioji; Takeo Asai, Sagamihara; Mitsumasa Ono, Sagamihara; Yoji Murakami, Sagamihara, all of Japan

[73] Assignee: Teijin Limited, Osaka, Japan

[21] Appl. No.: 453,476

[22] Filed: May 30, 1995

Related U.S. Application Data

[63] Continuation of Ser. No. 94,962, Jul. 22, 1993, abandoned.

[30] Foreign Application Priority Data

| Jul. 22, 1992 | [JP] | Japan | 4-195371 |
| Jul. 22, 1992 | [JP] | Japan | 4-195372 |
| Jul. 23, 1992 | [JP] | Japan | 4-196898 |

[51] Int. Cl.$^6$ ..................................... C09J 7/02
[52] U.S. Cl. ................. 428/343; 428/480; 428/355 EN
[58] Field of Search ........................ 428/343, 355, 428/480

[56] References Cited

U.S. PATENT DOCUMENTS

| 3,635,900 | 1/1972 | Price et al. |  |
| 4,041,206 | 9/1977 | Tsunashima et al. | 428/409 |
| 4,362,775 | 12/1982 | Yabe | 428/213 |
| 5,240,779 | 8/1993 | Ono | 428/458 |

FOREIGN PATENT DOCUMENTS

| 0312308 | 4/1989 | European Pat. Off. |
| 0415383 | 3/1991 | European Pat. Off. |
| 62-27424 | 5/1987 | Japan . |
| 1507876 | 4/1978 | United Kingdom . |
| 2181104 | 4/1987 | United Kingdom . |

OTHER PUBLICATIONS

Patent Abstracts of Japan vol. 17, No. 617 (C–1129) 15 Nov. 1993 & JP-A-05 186 612 (Teijin Ltd.) 27 Jul. 1993.

Database WPI Week 8228, Derwent Publications Ltd., London, GB; AN 82–58143E & JP-A-57 089 955 (Toray Ind., Inc.) 4 Jun. 1982.

*Primary Examiner*—Jenna Davis
*Attorney, Agent, or Firm*—Sherman and Shalloway

[57] ABSTRACT

A biaxially oriented laminated polyester film comprising (A) a first layer formed from a first copolyester which is composed of ethylene terephthalate unit as a main recurring unit, and (B) a second layer formed from a polyester composition containing (B1) a second copolyester which is composed of ethylene terephthalate unit as a main recurring unit and (B2) a third (co)polyester which is composed of butylene terephthalate unit as a main recurring unit and is contained in an amount of 1 to 40% by weight or (B3) a filler having an average particle diameter of 2.5 μm or less and is contained in an amount of 5 to 80% by weight in place of the third (co)polyester (B3), the second layer being to constitute a surface to be bonded onto a metal surface when the laminated film is laminated on the metal sheet. This composition can give metal cans, e.g., beverage cans and food cans, excellent in heat resistance, resistance to embrittlement under retort treatment, favor retention, impact resistance and anticorrosive properties.

16 Claims, No Drawings

BIAXIALLY ORIENTED LAMINATED POLYESTER FILM FOR USE AS FILM TO BE BONDED ONTO METAL SHEET

This application is a continuation of application Ser. No. 08/094,962, filed Jul. 22, 1993, now abandoned.

DETAILED DESCRIPTION OF THE INVENTION

The present invention relates to a biaxially oriented laminated polyester film for use as a film to be bonded to a metal sheet. More specifically, it relates to a biaxially oriented laminated polyester film which exhibits excellent processability in such a fabricating step that a metal sheet onto which the film is laminated is deep-drawn to make a can, and which can give metal cans, e.g., beverage cans and food cans, excellent in heat resistance, resistance to embrittlement under retort treatment, flavor retention, impact resistance and anticorrosive properties.

Inner and outer surfaces of metal cans are generally coated to be protected from corrosion. Recently, there have been developed methods for imparting rustproof property to metal cans without using paints or organic solvents for the purpose of simplification of manufacturing steps, improvement in sanitary condition and prevention of environmental pollution. As one of such methods, coating of metal cans with thermoplastic resin film has been attempted. More specifically, methods of laminating a metal sheet of, for example, tinplate, tin-free steel or aluminium, with a thermoplastic resin film and then making cans therefrom by deep-draw processing or the like are under investigation. As the thermoplastic resin film, use of polyolefin film or polyamide film was tried, but a film satisfying all of the required properties such as shaping processability, heat resistance and flavor retention has not yet been obtained.

On the other hand, a polyester film, in particular, a polyethylene terephthalate film, is drawing attention because of its well-balanced properties, and a number of proposals have been made using the polyester film as the base film.

Japanese Laid-open Patent Publication No. 10,451/1981 discloses a resin-coated metal sheet for containers, which comprises a metal sheet coated with a biaxially oriented polyester film, through a polyester adhesive layer composed of 5 to 80 wt. % of high-melting polyester having a melting point of not lower than 200° C. and 20 to 95 wt. % of a low-melting polyester having a melting point of not lower than 100° C. but lower than that of the high-melting polyester by 5° C.

Japanese Laid-open Patent Publication No. 192,546/1989 discloses a laminated steel plate having a two-layer coated structure, which is composed of an upper surface layer of a biaxially oriented polyethylene terephthalate resin, an under layer thereof of an unoriented polyester resin having a melting point lower than a thermosetting temperature of said biaxially oriented polyethylene terephthalate resin by 10° to 40° C., and a steel sheet.

In laminated metal sheets disclosed in above Japanese Laid-open Patent Publications Nos. 10,451/1981 and 192,546/1989, a biaxially oriented polyester film such as the biaxially oriented polyethylene terephthalate film exhibits excellent heat resistance and flavor retention. However, a problem remains to be solved that the film develops opacity (formation of fine cracks) or breakage during can-making processing which entails large deformation, because of insufficient shaping processability of the film.

Japanese Laid-open Patent Publication No. 192,545/1989 discloses a thin steel sheet with one of its surfaces coated with tin-plating film and the other surface, with chromium film or with the tin-plating film and chromium film applied thereon as the surface layer; and a laminated steel sheet for cans excelling in processability and corrosion resistance, which has, on the chromium coating on said thin steel sheet, an amorphous polyester resin coating having a melting point of 200° to 240° C. and a thickness of 10 to 100 μm.

Japanese Laid-open Patent Publication No. 57,339/1990 proposes, as a polyester film serving as internal lining of metal cans, a polyester films formed of a dicarboxylic acid component consisting of 50 to 95 mol % of terephthalic acid and 50 to 5 mol % of isophthalic acid and/or orthophthalic acid and a glycol component having 2 to 5 carbon atoms, said film having a specific gravity, as measured by Micro-Raman method after a heat treatment for 2 minutes at 210° C., of not more than 1.350.

Because the starting polyester for the polyester films in the products disclosed in Japanese Laid-open Patent Publications Nos. 192,545/1989 and 57,339/1990 is amorphous or very lowly crystalline, the films exhibit good shaping processability. However, they are inferior in flavor retention and are apt to become brittle during the post treatments such as printing, retort sterilizing after the can-making or during prolonged storage, and degenerate to readily produce cracks by externally exerted impact.

Japanese Laid-open Patent Publication No. 22,530/1989 discloses a polyester film to be laminated onto metal, which has a density of at least 1.385 and a planar orientation coefficient $fp$ of at least 0.130 but less than 0.160, said coefficient being expressed by the following equation:

$$fp=(n_1+n_2)/2n_3$$

wherein $n_1$=refractive index in the longitudinal direction; $n_2$=refractive index in the transverse direction; and $n_3$=refractive index in the thickness direction.

This polyester film to be laminated onto metal has not yet attained the low degree of orientation suitable for the can-making processing. Even when it could be processed within a range in which deformation is small, the film is liable to become brittle during subsequent printing and other retort treatments for sterilization and is likely to degenerate into a film that is readily cracked by externally exerted impact.

European Patent Publication No. 0415383A2 discloses a biaxially oriented polyester film for laminating a metal plate or forming a vessel comprising a copolyester which contains a lubricant having an average particle diameter of not greater than 2.5 μm and has a melting point of from 210° to 245° C. The film has a plane orientation coefficient of from 0.10 to 0.16, a thermal shrinkage at 150° C. of no higher than 10%, a density of lower than 1.385 g/cm³ a refractive index in a direction of thickness of from 1.495 to 1.530, and a film plane refractive index of from 1.61 to 1.66 in all directions.

European Patent Publication No. 0474240A2 discloses a polyester film for metal sheet lamination drawing and processing which comprises a co-polyester containing a lubricant having an average particle diameter of 2.5 μm or less the co-polyester having a melting point of 210° to 245° C. The refractive index in the direction of the film thickness is 1.505 to 1.550, the refractive index in the direction of the film plane is 1.61 to 1.66 about all directions, and subpeak by DSC is 150° to 205° C.

It is an object of the present invention to provide a biaxially oriented laminated polyester film for use as a film to be bonded to a metal sheet.

It is another object of the present invention to provide a biaxially oriented laminated polyester film for use as a film to be bonded to a metal sheet, which retains excellent processability, heat resistance, resistance to embrittlement under retort treatment and flavor retention property of a copolyester and which is also improved in impact resistance, particularly almost free from undergoing cracking by impact at a low temperature.

Other objects and advantages of the present invention will be apparent from the following description.

According to the present invention, the above objects and advantages of the present invention are achieved by a biaxially oriented laminated polyester film for use as a film to be bonded to a metal sheet, comprising:

(A) a first layer formed from a first copolyester which is composed of ethylene terephthalate unit as a main recurring unit and has a melting point of 210° to 245° C. and a glass transition temperature of 50° C. or higher, and (B) a second layer formed from a polyester composition containing (B1) a second copolyester which is composed of ethylene terephthalate unit as a main recurring unit and has a melting point of 210° to 245° C., and (B2) a third (co)polyester which is composed of butylene terephthalate unit as a main recurring unit and has a melting point of 180° to 223° C., the third copolyester being contained in an amount of 1 to 40% by weight based on the total weight of the second copolymer and the third (co)polyester, the second layer being to constitute a surface to be bonded onto a metal surface when the laminated film is laminated on the metal sheet.

Studies of the present inventors have revealed the following. A copolyester film is excellent in processability, heat resistance, resistance to embrittlement under retort treatment and flavor retention, but it is poor in impact resistance, particularly at a low temperature of 15° C. or lower. When a metal can formed of a laminate of a metal sheet and a polyester film is dropped to suffer an impact at a low temperature, the film is liable to undergo cracking. This poor impact resistance at a low temperature is of a great disadvantage for metal cans such as cans for juice or beverage which are handled in a cool state. That is, the present invention has been made on the basis of this finding by the present inventors.

The biaxially oriented laminated polyester film of the present invention comprises a first layer formed from a first copolyester and a second layer formed from a polyester composition. The polyester composition contains a second copolyester and a third (co)polyester.

The first copolyester constituting the first layer is composed of ethylene terephthalate unit as a main recurring unit. The acid component which is to constitute a subsidiary recurring unit includes, for example, aromatic dicarboxylic acids such as isophthalic acid, phthalic acid and naphthalenedicarboxylic acid; aliphatic dicarboxylic acids such as adipic acid, azelaic acid, sebaccic acid and decanedicarboxylic acid; and alicyclic dicarboxylic acids such as cyclohexanedicarboxylic acid. The glycol component which is to constitute the subsidiary recurring unit includes, for example, aliphatic diols such as butanediol and hexanediol; and alicyclic diols such as cyclohexanedimethanol.

The above acid components may be used alone or in combination, and the above glycol components may be used alone or in combination.

As the subsidiary recurring unit, preferred is an ethylene isophthalate unit.

The first copolyester has a melting point of 210° to 245° C. and a glass transition temperature of 50° C. or higher. When the melting point is lower than 210° C., the copolyester shows poor heat resistance. When the melting point is higher than 245° C., the copolyester has too high crystallizability and its processability is impaired. The melting point is preferably between 215 and 234° C.

When the glass transition temperature is lower than 50° C., no sufficient flavor retention is obtained. The glass transition temperature is preferably 60° C. or higher, more preferably 70° C. or higher.

The copolyester is measured for a melting point by a method in which a melting peak is determined with Du Pont Instruments 910 DSC at a temperature elevation rate of 20° C./minute. The amount of a sample for the measurement is about 20 mg.

The intrinsic viscosity of the first copolyester is preferably 0.52 to 0.80, more preferably 0.54 to 0.70, particularly preferably 0.57 to 0.65.

The first copolyester may contain a lubricant having an average particle diameter of 2.5 μm or smaller in an amount of 1% by weight or less as required. The lubricant may be inorganic or organic, while an inorganic lubricant is preferred. The inorganic lubricant is preferably selected, for example, from silica, alumina, titanium dioxide, calcium carbonate, barium sulfate and zirconia. The organic lubricant is selected, for example, from silicone and crosslinked polystyrene. A lubricant whose average particle diameter is greater than 2.5 μm is not preferred, since a pinhole is liable to occur starting from a coarse particle (e.g., particle having a size of 10 μm or greater) in a portion deformed in making a can by deep drawing, and the film is liable to break in some cases.

In view of freedom from a pinhole, preferred is a monodispersed lubricant which has an average particle diameter of 2.5 μm or less and an aspect ratio (longer diameter/shorter diameter) of 1.0 to 1.1. This preferred lubricant includes spherical particles such as spherical silica particles and spherical silicone particles. Due to the use of such a lubricant, the film is improved in handling (take-up) properties in a step of producing the film.

The second copolyester which is to constitute the polyester composition for the second layer is selected from the same copolyesters as those used for forming the above first copolyester. However, the first copolyester for the first layer and the second copolyester for the second layer are not required to be the same as each other.

The third (co)polyester constituting the polyester composition for the second layer is composed of butylene terephthalate unit as a main recurring unit. The acid component which is to constitute a subsidiary recurring unit includes, for example, aromatic dicarboxylic acids such as isophthalic acid, phthalic acid and naphthalenedicarboxylic acid; aliphatic dicarboxylic acids such as adipic acid, azelaic acid, sebaccic acid and decanedicarboxylic acid; and alicyclic dicarboxylic acids such as cyclohexanedicarboxylic acid. The glycol component which is to constitute the subsidiary recurring unit includes, for example, aliphatic diols such as ethylene glycol and hexanediol; and alicyclic diols such as cyclohexanedimethanol. The above acid components may be used alone or in combination, and the above glycol components may be used alone or in combination. As the subsidiary recurring unit, preferred is a butylene isophthalate unit.

The third (co)polyester is preferably a copolyester composed of butylene terephthalate unit as a main recurring unit and butylene isophthalate unit as a subsidiary recurring unit, or a butylene terephthalate homopolymer.

The third (co)polyester has a melting point of 180° to 223° C. The third (co)polyester includes a homopolymer having a melting point of 223° C. The copolyester having a melting point of less than 180° C. is insufficient in heat resistance. The melting point of the third (co)polyester is preferably 200° to 223° C., more preferably 210° to 223° C.

The melting point value of the third (co)polyester also refers to a value determined by the same method as that used for measuring the above first copolyester with Du Pont Instruments 910 DSC.

The polyester composition for the second layer contains 1 to 40% by weight, based on the total weight of the second copolyester and the third (co)polyester, of the third (co)polyester and a balance of the second copolyester. When the amount of the third (co)polyester is less than 1% by weight or when the amount of the second copolyester exceeds 99% by weight, the laminated polyester film cannot be improved in impact resistance at a low temperature. When the amount of the third (co)polyester exceeds 40% by weight or when the amount of the second copolyester is less than 60% by weight, the laminated polyester film shows decreased heat resistance and insufficient impact resistance.

The above second layer polyester composition may contain a filler having an average particle diameter of 2.5 μm or less as required. The content of the filler is preferably 5 to 30% by weight, more preferably 10 to 20% by weight.

The above filler may be inorganic or organic, while an inorganic filler is preferred. The inorganic filler is preferably selected, for example, from alumina, titanium dioxide, calcium carbonate and barium sulfate. Particularly preferred is titanium dioxide.

A filler whose average particle diameter is greater than 2.5 μm is not preferred, since a pinhole is liable to occur from a coarse particle (e.g., particle having a size of 10 μm or greater) as a starting point, in a portion deformed in making a can by deep drawing, and the film is liable to break. The average particle diameter of the filler is preferably 0.05 to 1.5 μm, more preferably 0.1 to 0.5 μm.

When the content of the filler exceeds 30% by weight, it is difficult to form a film. When it is less than 5% by weight, the effect on improvement in impact resistance at a low temperature is hardly observed.

It is preferred to adjust the particle diameter of the filler and remove coarse particles by subjecting the filler to a purification process before incorporating it into the polyester composition. The purification process is industrially carried out by means of a milling apparatus such as a jet mill or a ball mill and a classifying apparatus such as a dry or wet centrifugal separator. Naturally, the filler may be stepwise purified with two or more apparatus in combination.

For incorporating the filler into the polyester composition, the following methods are preferred.

(a) A method in which the filler is added before the termination of an ester interchange or esterification reaction or before the initiation of a polycondensation reaction in producing the second copolyester and/or the third (co)polyester.

(b) A method in which the filler is added to the second copolyester and/or the third (co)polyester and the mixture is melt-kneaded.

(c) A method in which a master polymer containing the filler in a larger amount than a predetermined amount is first prepared according to the above method (a) or (b) and then the master polymer is kneaded with a polymer containing no filler or containing the filler in a smaller amount than a predetermined amount.

When the above method (a) in which the filler is added in synthesizing the polyester is employed, preferably, the filler is dispersed in glycol to form a slurry and the slurry is added to a reaction system.

The first copolyester, second copolyester and third (co)polyester used in the present invention may be produced by any method. Further, these copolyesters may contain an antioxidant, a heat stabilizer, an ultraviolet absorbent and an antistatic agent as required.

The biaxially oriented laminated polyester film of the present invention comprises a first layer formed from the first copolyester and a second layer formed from the polyester composition containing the second copolyester and the third (co)polyester.

The thickness of the biaxially oriented laminated polyester film of the present invention is preferably 6 to 75μ, more preferably 10 to 75 μm, particularly preferably 15 to 50 μm. When the thickness is smaller than 6 μm, the film is liable to break in processing. When the thickness exceeds 75 μm, it is superfluous and such a film is uneconomical.

In the biaxially oriented laminated polyester film of the present invention, the ratio of the first layer thickness to the second layer thickness is preferably 0.02–0.8 to 1. This ratio is preferably 0.02–0.67 to 1, more preferably 0.04–0.43 to 1, particularly preferably 0.04–0.25 to 1.

The biaxially oriented laminated polyester film of the present invention can be produced, for example, by a method in which the copolyester for the first layer and the polyester composition for the second layer are individually melted, co-extruded, laminate-fused before solidification, biaxially oriented and thermoset, or by a method in which the copolyester and the polyester composition are individually melted and individually extruded to form films and these films are laminate-fused in an unstretched state or after stretched.

In the biaxially oriented laminated polyester film of the present invention, the above second layer constitutes a surface which is to be bonded to a metal surface. Because the second layer is that surface of the laminated polyester film which is bonded to a metal surface, the laminated polyester film undergoes almost no cracking against an impact at a low temperature in particular, and it is excellent in heat resistance, resistance to embrittlement under retort treatment and flavor retention.

The biaxially oriented laminated polyester film of the present invention is bonded to a metal sheet, particularly a metal sheet for forming cans. The metal sheet for can-making preferably includes sheets of tin, tin-free steel and aluminum. The biaxially oriented laminated polyester film is bonded to the metal sheet, for example, by any one of the following methods (1) and (2).

(1) A method in which the metal sheet is heated to a temperature equal to, or higher than, the melting point of the second layer constituting the film, the second layer surface is bonded to the metal surface, and then the film is cooled, whereby that surface layer portion (thin layer portion) of the film which is in contact with the metal sheet is rendered amorphous to intimately bond the second layer surface to the metal sheet.

(2) A method in which the second layer surface of the film is preliminarily coated with a primer adhesive, and this surface and the metal sheet is bonded to each other. The adhesive is selected from known resin adhesives such as an epoxy adhesive, an epoxy-ester adhesive and an alkyd adhesive.

According to studies by the present inventors, it has been found that the above objects of the present invention are also achieved by the following biaxially oriented laminated polyester film similarly to the above biaxially oriented laminated polyester film.

According to the present invention, therefore, there is also provided a biaxially oriented laminated polyester film for use as a film to be bonded to a metal sheet, comprising:

(A) a first layer formed from a first copolyester which is composed of ethylene terephthalate unit as a main recurring unit and has a melting point of 210° to 245° C. and a glass transition temperature of 50° C. or higher, and (B) a second layer formed from a polyester composition containing (B1) a second copolyester which is composed of ethylene terephthalate unit as a main recurring unit and has a melting point of 210° to 245° C., and (B3) a filler having an average particle diameter of 2.5 μm or less, the filler being contained in an amount of 5 to 80% by weight based on the total weight of the second copolymer and the filler, the second layer being to constitute a surface to be bonded onto a metal surface when the laminated film is laminated on the metal sheet.

The above biaxially oriented laminated polyester film is sometimes referred to as a second biaxially oriented laminated polyester film hereinafter. And, the biaxially oriented laminated polyester film previously described is sometimes referred to as a first biaxially oriented laminated polyester film hereinafter.

It should be understood that the description of the first copolyester and second copolyester of the first biaxially oriented laminated polyester film can be applied to the first copolyester and second copolyester of the second biaxially oriented laminated polyester film.

In the second biaxially oriented laminated polyester film as well, for example, the first copolyester is preferably composed of ethylene isophthalate as a subsidiary recurring unit, and the first copolyester may contain a lubricant having an average particle diameter of 2.5 μm or less in an amount of 1% by weight or less as required.

In the second biaxially oriented laminated polyester film, the second layer is formed from a polyester composition containing the second polyester and a filler having an average particle diameter of 2.5 μm or less. The content of the filler is 5 to 30% by weight based on the total weight of the second copolyester and the filler.

When the content of the filler exceeds 30% by weight, it is difficult to form a film. When it is less than 5% by weight, the effect on improvement in impact resistance at a low temperature is hardly observed.

The content of the filler is preferably 10 to 20% by weight.

The filler is selected from those described regarding the first biaxially oriented laminated polyester film. Similarly to the first biaxially oriented polyester film, preferred are alumina, titanium dioxide, calcium carbonate and barium sulfate. Titanium dioxide is particularly advantageously used.

The above second copolyester is preferably composed of ethylene isophthalate as a subsidiary recurring unit.

It should be understood that the description of the first biaxially oriented laminated polyester film can be directly applied to the second biaxially oriented laminated polyester film concerning its explanation other than the above.

The second layer of the second biaxially oriented laminated polyester film, too, constitutes a surface to be bonded to a metal sheet.

The first and second biaxially oriented laminated polyester films of the present invention may have an other layer in addition to the above first and second layers unless deviated from the objects of the present invention.

Hereinafter the present invention is further explained with reference to working Examples, in which part is by weight.

The property values indicated in those Examples were measured by the following methods.

(1) Intrinsic viscosity:

Measured for each sample as dissolved in ortho-chlorophenol at 35° C.

(2) Melting point and glass transition temperature:

Using Du Pont Instruments 910 DSC, the melting peak and glass transition temperature peak of each sample were determined at a temperature rise rate of 20° C./min. The amount of a sample for measurement was about 20 mg.

(3) Deep-drawing ability-1:

The processability was evaluated according to the following three-grade system.

A: Sample film could be deep-draw processed on both inner and outer surfaces of a metal can with no abnormality, and the film on said surfaces showed no opacification or breakage.

B: Opacification of the film is observed at upper portion of the metal can.

C: Breakage was observed in some portions of the film.

(4) Deep-drawing ability-2:

The processability was evaluated according to the following two-grade system.

A: Sample film could be deep-draw processed on both inner and outer surfaces of a metal can with no abnormality, and when the film-coated surface was subjected to a rust-proof test (hereinafter referred to as ERV test) (1% NaCl aqueous solution was charged in the can, an electrode was inserted therein to make the can body an anode, and when a voltage of 6 V was applied, an electric current value was measured) the current value was 0.1 mA or less.

B: The film showed no abnormality, but the measured current value in the ERV test was 0.2 mA or less in ERV test, and when the part through which the electric current was passed was magnified for observation, pinhole-like cracks starting at coarse lubricant particles were observed in the sample film.

(5) Resistance to crack by impact:

Excellently deep-draw processed cans were filled with water to full, and each group consisting of ten water-filled cans, after being cooled at 10° C., was dropped from a height of 1 m on a polyvinyl chloride tiled floor. Thereafter the cans were subjected to the ERV test. The results were evaluated in three-grade system as follows.

A: All ten cans showed the current value of 0.1 mA or less.

B: Five (5) to 9 cans showed the current value of 0.1 mA or less.

C: Either 4 or less cans showed the current value of 0.1 mA or less, or cracks in the film were already observed after the dropping.

(6) Resistance to embrittlement under heat:

Excellent deep-draw processed cans were heated at 200° C. for 5 minutes, and thereafter evaluated for their resistance to crack by impact in the same manner as described in (5) above.

A: All ten cans showed the current value of 0.1 mA or less.

B: Five (5) to 9 cans showed the current value of 0.1 mA or less.

C: Either 4 or less cans showed the current value of 0.1 mA or less, or cracks in the film were already observed after the heating at 200° C. for 5 minutes.

(7) Resistance to embrittlement under retort treatment (retort resistance):

Excellently deep-draw processed cans were filled with water to full, subjected to a retort treatment at 120° C. for an hour in a steam sterilizer, and thereafter kept at 50° C. for 30 days. Each group consisting ten of such cans was then dropped from a height of 1 m on a polyvinyl chloride tiled floor, and subjected to the ERV test.

A: All ten cans showed the current value of 0.1 mA or less,

B: Five (5) to 9 cans showed the current value of 0.1 mA or less.

C: Either 4 or less cans showed the current value of 0.1 mA or less, or cracks in the film were already observed after the dropping.

(8) Rustproof property:

Excellently deep-draw processed cans were filled with 1% aqueous solution of sodium chloride to full, left standing at 50° C. for 10 days and rusting of the metal sheet was evaluated.

A: No rust observed on any of ten cans.
B: Rust observed on 1 to 5 cans.
C: Rust observed on 6 or more cans.

(9) Flavor retention:

Ten (10) per group of excellently deep-draw processed cans were filled with an orange juice and sealed airtight. After storage at 37° C. for 30 days, the cans were opened and deterioration in flavor of their contents was sensuously evaluated by ten panelists.

A: All panelists sensed no change in flavor.
B: One (1) to 2 panelists sensed delicate change has occurred in flavor.
C: Three (3) to 10 panelists sensed appreciable change in flavor.

EXAMPLES 1–7

Comparative Examples 1–8

A polyethylene terephthalate having a subsidiary copolymer unit derived from a component shown in Table 1 (having an intrinsic viscosity of 0.64 and containing 0.3% by weight of titanium dioxide having an average particle diameter of 0.3 μm) and a polyester composition shown in Table 1 were individually dried, melted and co-extruded through adjacent dies according to conventional methods to laminate and fuse the extrudates, and the laminate was solidified by quenching to form an unstretched laminated film in which the polyethylene terephthalate formed a copolyester layer (A) and the polyester composition formed a polyester layer (B).

Then, the above unstretched film was stretched in the longitudinal direction at a stretch ratio of 3.1 at 110° C. and then stretched in the transverse direction at a stretch ratio of 8 at 125° C., and the stretched film was thermoset at 190° C. to give a biaxially oriented laminated film.

The above-obtained film had a thickness of 25 μm. The copolyester layer (A) had a thickness of 5 μm, and the polyester layer (B) had a thickness of 20

Comparative Examples 9 and 10

A single-layered film formed of a copolyester layer (A) alone (Comparative Example 9) and a single-layered film formed of a polyester layer (B) alone (Comparative Example 10) were prepared in the same manner as in Example 6.

Seventeen films obtained in Examples 1 to 7 and Comparative Examples 1 to 10 were bonded to 0.25 mm thick tin-free steel sheets preheated at 250° C. such that the copolyester layers (B) (the copolyester layer (A) of the film obtained in Comparative Example 9) were in contact with the steel sheets, and the resultant laminates were cooled with water. Disk-shaped pieces having a diameter of 150 mm were cut out from the laminates, and deep-drawn at four stages with a drawing die and a punch to produce side-seamless containers having a diameter of 55 mm (to be abbreviated as cans hereinafter).

The above cans were observed and tested for properties shown in Table 2, and Table 2 shows the results.

TABLE 1

| | Copolyester layer (A) | | | | Copolyester layer (B) | | | | | | | | |
| | | | | | Copolymer PET* | | | | PBT** or copolymer PBT | | | | |
| | Copolymer component | | Melting | Glass transition | Copolymer component | | Melting | | | Copolymer component | | Melting | | |
| | Composition | mole % | point (°C.) | temp. (°C.) | Composition | mole % | point (°C.) | Intrinsic viscosity*** | Weight (%) | Composition | mole % | point (°C.) | Intrinsic viscosity*** | Weight (%) |
|---|---|---|---|---|---|---|---|---|---|---|---|---|---|---|
| Comp. Ex. 1 | Isophthalic acid | 20 | 206 | 73 | Isophthalic acid | 12 | 229 | 0.71 | 75 | — | — | 223 | 0.91 | 25 |
| Ex. 1 | Isophthalic acid | 18 | 213 | 73 | Isophthalic acid | 12 | 229 | 0.71 | 75 | — | — | 223 | 0.91 | 25 |
| Ex. 2 | Isophthalic acid | 12 | 229 | 73 | Isophthalic acid | 12 | 229 | 0.71 | 75 | — | — | 223 | 0.91 | 25 |
| Ex. 3 | Isophthalic acid | 8 | 239 | 74 | Isophthalic acid | 12 | 229 | 0.71 | 75 | — | — | 223 | 0.91 | 25 |
| Comp. Ex. 2 | Isophthalic acid | 2 | 250 | 76 | Isophthalic acid | 12 | 229 | 0.71 | 75 | — | — | 223 | 0.91 | 25 |
| Comp. Ex. 3 | Sebaccic acid | 9 | 235 | 55 | Isophthalic acid | 12 | 229 | 0.71 | 75 | — | — | 223 | 0.91 | 25 |
| Ex. 4 | Sebaccic acid | 5 | 245 | 64 | Isophthalic acid | 12 | 229 | 0.71 | 75 | — | — | 223 | 0.91 | 25 |
| Comp. Ex. 4 | Isophthalic | 12 | 229 | 73 | Isophthalic | 9 | 235 | 0.65 | 55 | Isophthalic | 5 | 214 | 0.89 | 45 |

TABLE 1-continued

| | Copolyester layer (A) | | | | Copolyester layer (B) | | | | | | | | |
|---|---|---|---|---|---|---|---|---|---|---|---|---|---|
| | | | | Glass | Copolymer PET* | | | | PBT** or copolymer PBT | | | | |
| | Copolymer component | | Melting | transition | Copolymer component | | Melting | Intrinsic | | Copolymer component | | Melting | Intrinsic | |
| | Composition | mole % | point (°C.) | temp. (°C.) | Composition | mole % | point (°C.) | viscosity*** | Weight (%) | Composition | mole % | point (°C.) | viscosity*** | Weight (%) |
| Ex. 5 | Iso-phthalic acid | 12 | 229 | 73 | Iso-phthalic acid | 9 | 235 | 0.70 | 60 | Iso-phthalic acid | 5 | 214 | 0.89 | 40 |
| Ex. 6 | Iso-phthalic acid | 12 | 229 | 73 | Sebaccic acid | 9 | 235 | 0.70 | 90 | Iso-phthalic acid | 5 | 214 | 0.89 | 10 |
| Ex. 7 | Iso-phthalic acid | 12 | 229 | 73 | Sebaccic acid | 12 | 229 | 0.70 | 96 | — | — | 223 | 0.91 | 4 |
| Comp. Ex. 5 | Iso-phthalic acid | 12 | 229 | 73 | Sebaccic acid | 12 | 229 | 0.65 | 100 | — | — | — | — | 0 |
| Comp. Ex. 6 | Iso-phthalic acid | 12 | 229 | 73 | Iso-thalic acid | 3 | 247 | 0.65 | 85 | — | — | 223 | 0.91 | 15 |
| Comp. Ex. 7 | Iso-phthalic acid | 12 | 229 | 73 | Iso-phthalic acid | 22 | 208 | 0.65 | 85 | — | — | 223 | 0.92 | 15 |
| Comp. Ex. 8 | Iso-phthalic acid | 12 | 229 | 73 | Iso-phthalic acid | 12 | 229 | 0.65 | 85 | Iso-phthalic acid | 20 | 178 | 0.87 | 15 |

*PET: Polyethylene terephthalate
**PBT: Polybutylene terephthalate
***Intrinsic viscosity before preparation of composition

TABLE 2

| | Deep-draw property 1 | Deep-draw property 2 | Impact resistance | Resistance to embrittlement under heat | Resistance to embrittlement under retort treatment | Rustproof property | Flavor retention |
|---|---|---|---|---|---|---|---|
| Comp. Ex. 1 | A | B | C | C | B | B | A |
| Ex. 1 | A | A | A | A | A | A | A |
| Ex. 2 | A | A | A | A | A | A | A |
| Ex. 3 | A | A | A | A | A | A | A |
| Comp. Ex. 2 | C | — | — | — | — | — | — |
| Comp. Ex. 3 | A | A | A | A | B | C | C |
| Ex. 4 | A | A | A | A | A | A | A |
| Comp. Ex. 4 | A | B | B | C | B | A | B |
| Ex. 5 | A | A | A | A | A | A | A |
| Ex. 6 | A | A | A | A | A | A | A |
| Ex. 7 | A | A | A | A | A | A | A |
| Comp. Ex. 5 | A | A | B | A | B | A | B |
| Comp. Ex. 6 | C | — | — | — | — | — | — |
| Comp. Ex. 7 | A | B | B | C | B | A | A |
| Comp. Ex. 8 | A | A | A | C | C | A | A |
| Comp. Ex. 9 | A | B | C | B | B | A | A |
| Comp. Ex. 10 | A | A | A | A | A | C | C |

EXAMPLES 8–13

Comparative Examples 11–15

A polyethylene terephthalate having a subsidiary copolymer unit derived from a component shown in Table 3 (having an intrinsic viscosity of 0.64 and containing 0.3% by weight of titanium dioxide having an average particle diameter of 0.3 μm) and a polyethylene terephthalate having a subsidiary copolymer unit derived from a component shown in Table 3 (having an intrinsic viscosity of 0.64 and containing 18% by weight of titanium dioxide having an average particle diameter of 0.27 μm) were individually dried, melted and co-extruded through adjacent dies according to conventional methods to laminate and fuse the extrudates, and the laminate was solidified by quenching to form an unstretched laminated film in which the former polyethylene terephthalate formed a copolyester layer (A) and the latter polyethylene terephthalate formed a polyester layer (B).

Then, the above unstretched film was stretched in the longitudinal direction at a stretch ratio of 3.0 at 110° C. and then stretched in the transverse direction at a stretch ratio of 3 at 125° C., and the stretched film was thermoset at 190° C. to give a biaxially oriented laminated film.

The above-obtained film had a thickness of 25 μm. The copolyester layer (A) had a thickness of 5 μm, and the polyester layer (B) had a thickness of 20 μm.

TABLE 4

|  | Content of titanium dioxide (wt. %) |
|---|---|
| Comparative Example 16 | 3 |
| Example 14 | 6 |
| Example 15 | 10 |
| Example 16 | 28 |
| Comparative Example 17 | 32 |

Sixteen films obtained in Examples 8 to 16 and Comparative Examples 11 to 17 were bonded to 0.25 mm thick tin-free steel sheets preheated at 250° C. such that the copolyester layers (B) were in contact with the steel sheets, and the resultant laminates were cooled with water. Disk-shaped pieces having a diameter of 150 mm were cut out from the laminates, and deep-drawn at four stages with a drawing die and a punch to produce side-seamless containers having a diameter of 55 mm (to be abbreviated as cans hereinafter).

The above cans were observed and tested for properties shown in Table 5, and Table 5 shows the results.

TABLE 3

| | Copolyester layer (B) | | | | Copolyester layer (A) | | | |
|---|---|---|---|---|---|---|---|---|
| | Copolymer component | | Melting point | Glass transition temp. | Copolymer component | | Melting point | Glass transition temp. |
| | Composition | mole % | (°C.) | (°C.) | Composition | mole % | (°C.) | (°C.) |
| Comp. Ex. 11 | Isophthalic acid | 20 | 205 | 73 | Isophthalic acid | 12 | 228 | 73 |
| Ex. 8 | " | 17 | 215 | 73 | " | 12 | 228 | 73 |
| Ex. 9 | " | 12 | 229 | 73 | " | 12 | 228 | 73 |
| Ex. 10 | " | 8 | 239 | 74 | " | 12 | 228 | 73 |
| Comp. Ex. 12 | " | 4.5 | 248 | 76 | " | 12 | 228 | 73 |
| Comp. Ex. 13 | Sebaccic acid | 9 | 235 | 55 | " | 12 | 228 | 73 |
| Ex. 11 | " | 5 | 245 | 64 | " | 12 | 228 | 73 |
| Comp. Ex. 14 | Isophthalic acid | 12 | 229 | 73 | " | 20 | 205 | 73 |
| Ex. 12 | " | 12 | 229 | 73 | " | 17 | 215 | 73 |
| Ex. 13 | " | 12 | 229 | 73 | " | 8 | 239 | 74 |
| Comp. Ex. 15 | " | 12 | 229 | 73 | " | 1 | 255 | 76 |

EXAMPLES 14–18

Comparative Examples 18–17

Example 9 was repeated except that the amount of titanium dioxide to be contained in the copolyester layer (B) was changed as shown in Table 4.

TABLE 5

|  | Deep-draw property 1 | Deep-draw property 2 | Impact resistance | Resistance to embrittlement under heat | Resistance to embrittlement under retort treatment | Rustproof property | Flavor retention |
|---|---|---|---|---|---|---|---|
| Comp. Ex. 11 | A | A | B | C | C | A | A |
| Ex. 8 | A | A | A | A | A | A | A |
| Ex. 9 | A | A | A | A | A | A | A |
| Ex. 10 | A | A | A | A | A | A | A |
| Comp. Ex. 12 | C | — | — | — | — | — | — |
| Comp. Ex. 13 | A | A | B | A | B | B | C |
| Ex. 11 | A | A | A | A | A | A | A |
| Comp. Ex. 14 | A | B | B | C | B | A | A |
| Ex. 12 | A | A | A | A | A | A | A |
| Ex. 13 | A | A | A | A | A | A | A |
| Comp. Ex. 15 | C | — | — | — | — | — | — |
| Comp. Ex. 16 | A | A | C | A | A | A | A |
| Ex. 14 | A | A | A | A | A | A | A |
| Ex. 15 | A | A | A | A | A | A | A |
| Ex. 16 | A | A | A | A | A | A | A |
| Comp. Ex. 17 | C | — | — | — | — | — | — |

EXAMPLES 17–23

Comparative Examples 18–25

A polyethylene terephthalate having a subsidiary copolymer unit derived from a component shown in Table 6 (having an intrinsic viscosity of 0.64 and containing 0.3% by weight of titanium dioxide having an average particle diameter of 0.3 μm) and a polyester composition shown in Table 6 (containing 18% by weight of titanium dioxide having an average particle diameter of 0.27 μm) were individually dried, melted and co-extruded through adjacent dies according to conventional methods to laminate and fuse the extrudates, and the laminate was solidified by quenching to form an unstretched laminated film in which the former polyethylene terephthalate formed a copolyester layer (A) and the latter polyethylene terephthalate formed a polyester layer (B).

Then, the above unstretched film was stretched in the longitudinal direction at a stretch ratio of 2.9 at 100° C. and then stretched in the transverse direction at a stretch ratio of 3 at 120° C., and the stretched film was thermoset at 190° C. to give a biaxially oriented laminated film.

The above-obtained film had a thickness of 25 μm. The copolyester layer (A) had a thickness of 5 μm, and the polyester layer (B) had a thickness of 20 μm.

EXAMPLES 24–26

Comparative Example 26

Example 18 was repeated except that the amount of titanium dioxide to be contained in the copolyester layer (B) was changed as shown in Table 7.

Nineteen films obtained in Examples 17 to 26 and Comparative Examples 18 to 26 were bonded to 0.25 mm thick tin-free steel sheets preheated at 250° C. such that the copolyester layers (B) were in contact with the steel sheets, and the resultant laminates were cooled with water. Disk-shaped pieces having a diameter of 150 mm were taken from the laminates, and deep-drawn at four stages with a drawing die and a punch to produce side-seamless containers having a diameter of 55 mm (to be abbreviated as cans hereinafter).

The above cans were observed and tested for properties shown in Table 8, and Table 8 shows the results.

TABLE 6

| | Copolyester layer (A) | | | | Copolyester layer (B) | | | | | | | | |
|---|---|---|---|---|---|---|---|---|---|---|---|---|---|
| | Copolymer component | | Melting point (°C.) | Glass transition temp. (°C.) | Copolymer PET* | | | | | PBT** or copolymer PBT | | | |
| | | | | | Copolymer component | | Melting point (°C.) | Intrinsic viscosity*** | Weight (%) | Copolymer component | | Melting point (°C.) | Intrinsic viscosity*** | Weight (%) |
| | Composition | mole % | | | Composition | mole % | | | | Composition | mole % | | | |
| Comp. Ex. 18 | Isophthalic acid | 20 | 206 | 73 | Isophthalic acid | 12 | 229 | 0.71 | 75 | — | — | 223 | 0.91 | 25 |
| Ex. 17 | Isophthalic acid | 18 | 213 | 73 | Isophthalic acid | 12 | 229 | 0.71 | 75 | — | — | 223 | 0.91 | 25 |

TABLE 6-continued

| | Copolyester layer (A) | | | Copolyester layer (B) | | | | | | | | |
|---|---|---|---|---|---|---|---|---|---|---|---|---|
| | | | Glass | Copolymer PET* | | | | PBT** or copolymer PBT | | | | |
| | Copolymer component | Melting | transition | Copolymer component | | Melting | | | Copolymer component | | Melting | | |
| | Composition | mole % | point (°C.) | temp. (°C.) | Composition | mole % | point (°C.) | Intrinsic viscosity*** | Weight (%) | Composition | mole % | point (°C.) | Intrinsic viscosity*** | Weight (%) |
| Ex. 18 | Isophthalic acid | 12 | 229 | 73 | Isophthalic acid | 12 | 229 | 0.71 | 75 | — | — | 223 | 0.91 | 25 |
| Ex. 19 | Isophthalic acid | 8 | 239 | 74 | Isophthalic acid | 12 | 229 | 0.71 | 75 | — | — | 223 | 0.91 | 25 |
| Comp. Ex. 19 | Isophthalic acid | 2 | 250 | 76 | Isophthalic acid | 12 | 229 | 0.71 | 75 | — | — | 223 | 0.91 | 25 |
| Comp. Ex. 20 | Sebaccic acid | 9 | 235 | 55 | Isophthalic acid | 12 | 229 | 0.71 | 75 | — | — | 223 | 0.91 | 25 |
| Ex. 20 | Sebaccic acid | 5 | 245 | 64 | Isophthalic acid | 12 | 229 | 0.71 | 75 | — | — | 223 | 0.91 | 25 |
| Comp. Ex. 21 | Isophthalic acid | 12 | 229 | 73 | Isophthalic acid | 9 | 235 | 0.65 | 55 | Isophthalic acid | 5 | 214 | 0.89 | 45 |
| Ex. 21 | Isophthalic acid | 12 | 229 | 73 | Isophthalic acid | 9 | 235 | 0.70 | 60 | Isophthalic acid | 5 | 214 | 0.89 | 40 |
| Ex. 22 | Isophthalic acid | 12 | 229 | 73 | Sebaccic acid | 9 | 235 | 0.70 | 90 | Isophthalic acid | 5 | 214 | 0.89 | 10 |
| Ex. 23 | Isophthalic acid | 12 | 229 | 73 | Sebaccic acid | 12 | 229 | 0.70 | 96 | — | — | 223 | 0.91 | 4 |
| Comp. Ex. 22 | Isophthalic acid | 12 | 229 | 73 | Sebaccic acid | 12 | 229 | 0.65 | 100 | — | — | — | — | 0 |
| Comp. Ex. 23 | Isophthalic acid | 12 | 229 | 73 | Isophthalic acid | 3 | 247 | 0.65 | 85 | — | — | 223 | 0.91 | 15 |
| Comp. Ex. 24 | Isophthalic acid | 12 | 229 | 73 | Isophthalic acid | 22 | 208 | 0.65 | 85 | — | — | 223 | 0.92 | 15 |
| Comp. Ex. 25 | Isophthalic acid | 12 | 229 | 73 | Isophthalic acid | 12 | 229 | 0.65 | 85 | Isophthalic acid | 20 | 178 | 0.87 | 15 |

*PET: Polyethylene terephthalate
**PBT: Polybutylene terephthalate
***Intrinsic viscosity before preparation of composition

TABLE 7

| | Content of titanium dioxide (wt. %) |
|---|---|
| Example 24 | 6 |
| Example 25 | 10 |
| Example 26 | 28 |
| Comparative Example 26 | 32 |

TABLE 8

|  | Deep-draw property 1 | Deep-draw property 2 | Impact* resistance | Resistance to embrittlement under heat | Resistance to embrittlement under retort treatment | Rustproof property | Flavor retention |
|---|---|---|---|---|---|---|---|
| Comp. Ex. 18 | A | B | C | C | C | C | A |
| Ex. 17 | A | A | A | A | A | A | A |
| Ex. 18 | A | A | A | A | A | A | A |
| Ex. 19 | A | A | A | A | A | A | A |
| Comp. Ex. 19 | C | — | — | — | — | — | — |
| Comp. Ex. 20 | A | A | A | A | A | A | C |
| Ex. 20 | A | A | A | A | A | A | A |
| Comp. Ex. 21 | C | — | — | — | — | — | — |
| Ex. 21 | A | A | A | A | A | A | A |
| Ex. 22 | A | A | A | A | A | A | A |
| Ex. 23 | A | A | A | A | A | A | A |
| Comp. Ex. 22 | C | — | — | — | — | — | — |
| Comp. Ex. 23 | A | A | C | A | B | A | A |
| Comp. Ex. 24 | C | B | C | C | B | A | A |
| Comp. Ex. 25 | A | A | A | C | C | A | A |
| Ex. 24 | A | A | A | A | A | A | A |
| Ex. 25 | A | A | A | A | A | A | A |
| Ex. 26 | A | A | A | A | A | A | A |
| Comp. Ex. 26 | C | — | — | — | — | — | — |

*Water-filled can was dropped after cooled to 5° C.

What is claimed is:

1. A biaxially oriented laminated polyester film for use as a film to be bonded to a metal sheet, comprising:
   (A) a first layer formed from a first copolyester which is composed of ethylene terephthalate unit as a main recurring unit and has a melting point of 210° to 245° C. and a glass transition temperature of 50° C. or higher, and
   (B) a second layer formed from a polyester composition containing (B1) a second copolyester which is composed of ethylene terephthalate unit as a main recurring unit and has a melting point of 210° to 245° C., and (B2) a third (co)polyester which is composed of butylene terephthalate unit as a main recurring unit and has a melting point of 200° to 223° C., the third (co)polyester being contained in an amount of 1 to 40% by weight based on the total weight of the second copolymer and the third (co)polyester,
   the second layer being to constitute a surface to be bonded onto a metal surface when the laminated film is laminated on the metal sheet.

2. The film of claim 1, wherein the first copolyester has an ethylene isophthalate unit as a subsidiary recurring unit.

3. The film of claim 1, wherein the first copolyester contains a lubricant having an average particle diameter of 2.5 μm or smaller in an amount of 1% by weight or less.

4. The film of claim 3, wherein the lubricant is of spherical particles.

5. The film of claim 1, wherein the second copolyester has an ethylene isophthalate unit as a subsidiary recurring unit.

6. The film of claim 1, wherein the third (co)polyester is either a copolyester composed of butylene terephthalate unit as a main recurring unit and butylene isophthalate unit as a subsidiary recurring unit or a butylene terephthalate homopolymer.

7. The film of claim 1, wherein the second layer polyester composition contains 5 to 30% by weight of a filler (B3) having an average particle diameter of 2.5 μm or smaller.

8. The film of claim 7, wherein the filler (B3) is at least one member selected from the group consisting of alumina, titanium dioxide, calcium carbonate and barium sulfate.

9. The film of claim 1, wherein the first layer and the second layer have a first layer thickness/second layer thickness ratio of 0.02–0.8/1.

10. The film of claim 1, wherein the film has a thickness of 6 to 75 μm.

11. The biaxially oriented laminated polyester film of claim 1 bonded to a metal sheet.

12. A biaxially oriented laminated copolyester film for use as a film to be bonded to a metal sheet, comprising,
   (A) A first layer formed from a first copolyester which is composed of ethylene terephthalate unit as a main recurring unit and has a melting point of 210° to 245° C. and a glass transition temperature of 50° C. or higher, said first polyester containing a lubricant having an average particle diameter of 2.5 μm or smaller in an amount of 1% by weight or less, and
   (B) a second layer formed from a polyester composition containing (B1) a second copolyester which is composed of ethylene terephthalate unit as a main recurring unit and has a melting point of 210° to 245° C., and (B2) a third (co)polyester which is composed of butylene terephthalate unit as a main recurring unit and has a melting point of 210° to 223° C. the third (co)polyester being contained in an amount of 1 to 40% by weight based on the total weight of the second copolymer and the third (co)polyester,
   the second layer containing 5 to 30% by weight of a filler (B3) having an average particle diameter of 2.5 μm or smaller, and the second layer being to constitute a surface to be bonded onto a metal surface when the laminated film is laminated on the metal sheet.

13. The film of claim 12, wherein the first layer and the second layer have a first layer thickness/second layer thickness ratio of 0.02–0.8/1.

14. The film of claim 12, wherein the film has a thickness of 6 to 75 μm.

15. The biaxially oriented laminated polyester film of claim 1, bonded to a metal sheet.

16. A biaxially oriented laminated polyester film for use as a film to be bonded to metal sheet, comprising:

(A) a first layer formed from a first copolyester which is composed of ethylene terephthalate unit as a main recurring unit and has a melting point of 210° to 245° C. and a glass transition temperature of 50° C. or higher, and (B) a second layer formed from a polyester composition containing (B1) a second copolyester which is composed of ethylene terephthalate unit as a main recurring unit and has a melting point of 210° to 245° C., and (B2) a third (co)polyester which is composed of butylene terephthalate unit as a main recurring unit and has a melting point of 210° to 223° C., the third (co)polyester being contained in an amount of 1 to 40% by weight based on the total weight of the second copolymer and the third (co)polyester, the second layer being to constitute a surface to be bonded onto a metal surface when the laminated film is laminated on the metal sheet.

* * * * *